US007862637B2

(12) United States Patent
Han et al.

(10) Patent No.: US 7,862,637 B2
(45) Date of Patent: Jan. 4, 2011

(54) MULTI-CYCLONE DUST SEPARATOR

(75) Inventors: Jung-gyun Han, Gwangju (KR); Joung-soo Park, Jeollabuk-do (KR); Byung-jo Lee, Gwangju (KR); Tae-gwang Kim, Gwangju (KR); See-hyun Kim, Gwangju (KR); Sung-soo Ahn, Jeollabuk-do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 269 days.

(21) Appl. No.: 12/229,537

(22) Filed: Aug. 25, 2008

(65) Prior Publication Data

US 2009/0241491 A1 Oct. 1, 2009

(30) Foreign Application Priority Data

Mar. 25, 2008 (KR) ...................... 10-2008-0027436

(51) Int. Cl.
*B01D 45/12* (2006.01)

(52) U.S. Cl. ............................ 55/345; 55/346; 55/426; 55/429; 55/433; 55/457; 55/DIG. 3

(58) Field of Classification Search ................... 55/345, 55/346, 349, 429, 433, 426, 457, DIG. 3
See application file for complete search history.

(56) References Cited

U.S. PATENT DOCUMENTS 7,691,161 B2 * 4/2010 Oh et al. ....................... 55/337
2008/0223010 A1 * 9/2008 Han et al. ..................... 55/345

FOREIGN PATENT DOCUMENTS

| | | |
|---|---|---|
| EP | 0885585 | 12/1998 |
| GB | 2374032 | 10/2002 |
| GB | 2435626 | 9/2007 |
| JP | 08-322769 | 12/1996 |
| JP | 2003-180582 | 7/2003 |
| WO | WO02/03844 | 1/2002 |

OTHER PUBLICATIONS

Search and Examination Report dated Jan. 21, 2009 corresponding to United Kingdom Patent Application No. GB0817316.3.

* cited by examiner

*Primary Examiner*—Robert A Hopkins
(74) *Attorney, Agent, or Firm*—Ohlandt, Greeley, Ruggiero & Perle, LLP

(57) ABSTRACT

A multi-cyclone dust separator is provided, including a first cyclone unit that centrifugally separates dust from dust-laden air drawn into the first cyclone unit through a first air inlet, and a second cyclone unit that is formed inside the first cyclone unit, wherein the second cyclone unit includes a second cyclone body that has a second air inlet through which the air, from which the dust is separated by the first cyclone unit, enters the second cyclone body, and a guide unit that enables the air entering the second cyclone unit to be rotated.

20 Claims, 10 Drawing Sheets

MULTI-CYCLONE DUST SEPARATOR

CROSS-REFERENCE TO RELATED APPLICATIONS

This application claims the benefit under 35 U.S.C. §119 of Korean Patent Application No. 10-2008-0027436, filed in the Korean Intellectual Property Office on Mar. 25, 2008, the entire disclosure of which is incorporated herein by reference.

BACKGROUND OF THE INVENTION

1. Field of the Invention

The present disclosure relates to a vacuum cleaner, and more particularly to a multi-cyclone dust separator having improved efficiency in separating fine dust.

2. Description of the Related Art

Vacuum cleaners have a wide variety of dust separators, but recently cyclone dust separators, which separate dust from dust-laden air using a centrifugal force, have generally been used.

Cyclone dust separators form a rotating air current and centrifugally separate dust from dust-laden air. Since such cyclone dust separators do not need disposable filters such as dust bags, such cyclone dust separators can be used permanently. However, such cyclone dust separators have a weaker suction force at the initial operation than dust separators using dust bags, and have difficulty in separating fine dust. In order to complement these shortcomings of the cyclone dust separator, multi-cyclone dust separators have been developed.

A multi-cyclone dust separator primarily filters large dust and contaminants using a first cyclone dust separator, and secondarily filters primarily-filtered air using a second cyclone dust separator, so the effect of separating fine dust is superior to conventional cyclone dust separators.

In such a multi-cyclone dust separator, a plurality of second cyclone dust separators are generally disposed around a first cyclone dust separator in parallel. In this arrangement, the volume of a multi-cyclone dust separator is large. In order to address this drawback, the first and second cyclone dust separators may be made small. In this case, however, since the second cyclone dust separators are small and the air paths of the second cyclone dust separators are narrow, the air paths may frequently become clogged and thus malfunctions may occur.

SUMMARY OF THE INVENTION

An aspect of embodiments of the present disclosure is to solve at least the above problems and/or disadvantages and to provide at least the advantages described below. Accordingly, an aspect of embodiments of the present disclosure is to provide a vacuum cleaner having a multi-cyclone dust separator that miniaturizes the vacuum cleaner and enhances dust separation efficiency by improving the location of second cyclone dust separators.

In order to achieve the above-described and other aspects of embodiments of the present disclosure, a multi-cyclone dust separator is provided, including a first cyclone unit that centrifugally separates dust from dust-laden air drawn into the first cyclone unit through a first air inlet, and a second cyclone unit that is formed inside the first cyclone unit, wherein the second cyclone unit includes a second cyclone body that includes a second air inlet through which the air, from which the dust is separated by the first cyclone unit, enters the second cyclone body, and a guide unit that enables the air entering the second cyclone unit to be rotated.

The multi-cyclone dust separator may further include a dust blocking unit that prevents the dust separated by the first cyclone unit from entering the second cyclone unit through the second air inlet.

The dust blocking unit may include a plurality of guide vanes that are formed on the second air inlet at regular intervals, or a plurality of holes that are formed on the second air inlet.

The second cyclone unit may include an air discharge hole that is formed on a bottom surface of the second cyclone body, and an air discharge pipe that is fixed to the second cyclone body and is connected to the air discharge hole.

The air discharge hole may be formed on the center of a dust separator cover that opens or closes bottom surfaces of the first cyclone unit and the second cyclone unit.

The air discharge pipe is formed lower than the dust blocking unit.

The guide unit according to a first exemplary embodiment of the present disclosure may include a guide pipe that is formed inside the second air inlet, and a plurality of guide ribs that protrude from an external surface of the guide pipe. The guide ribs may be formed lower than the dust blocking unit and are slanted in the same direction.

The guide unit according to a second exemplary embodiment of the present disclosure may include a guide pipe that is formed inside the second air inlet, and a plurality of guide ribs that protrude from an internal surface of the second cyclone body and are slanted in the same direction.

The diameter of the guide pipe according to the first and second exemplary embodiments of the present disclosure may be greater than the diameter of the air discharge pipe.

The guide unit according to a third exemplary embodiment of the present disclosure may include a guide dome that is formed inside the second air inlet and has a hemisphere shape, and a plurality of guide dome ribs that protrude from an external surface of the guide dome and are slanted in the same direction.

The diameter of the guide dome may be greater than the diameter of the air discharge pipe.

In a fourth exemplary embodiment of the present disclosure, the second cyclone unit may further include a conical guide, an upper part of that is connected to an internal surface of the second cyclone body and a lower part of that has a diameter that is less than the second cyclone body and greater than the air discharge pipe.

In a fifth exemplary embodiment of the present disclosure, the second cyclone unit may include an air discharge hole that is formed on an upper part of the second cyclone body, and an air discharge pipe that is fixed to the second cyclone body and is connected to the air discharge hole.

The second cyclone unit may further include a conical guide, an upper part of which is connected to an internal surface of the second cyclone body and a lower part of which has a diameter that is less than the second cyclone body and greater than the air discharge pipe.

In a sixth exemplary embodiment of the present disclosure, a multi-cyclone dust separator may include a first cyclone unit that centrifugally separates dust from dust-laden air drawn into the first cyclone unit through a first air inlet, a second cyclone unit that is formed inside the first cyclone unit, and a third cyclone unit that is formed inside the second cyclone unit, wherein the second cyclone unit includes a second cyclone body that includes a second air inlet through which the air, from which the dust is separated by the first cyclone unit, enters the second cyclone body, and a first guide unit that enables the air entering the second cyclone unit to be rotated, and wherein the third cyclone unit includes a third cyclone body that includes a third air inlet through which the air, from which the dust has been separated by the second cyclone unit, enters the third cyclone body, and a second guide unit that enables the air entering the third cyclone unit to be rotated.

The multi-cyclone dust separator may further include a dust blocking unit that prevents the dust separated by the first cyclone unit from entering the second cyclone unit through the second air inlet.

The second cyclone unit may be fixed to a core of the first cyclone unit, and the third cyclone unit may be fixed to a core of the second cyclone unit.

The third cyclone unit may include a third cyclone body that is fixed to an internal surface of the second cyclone unit using at least one first fixing rib, an air discharge hole that is formed on a bottom surface of the third cyclone body, and an air discharge pipe that is fixed to an internal surface of the third cyclone body using at least one second fixing rib and is connected to the air discharge hole.

The first guide unit may include a first guide pipe that is formed inside the second air inlet and has a diameter that is greater than the second cyclone unit, and a plurality of first guide ribs that protrude from an external surface of the first guide pipe and are slanted in the same direction.

The second guide unit may include a second guide pipe that is formed inside the third air inlet and one end of which is connected to the first guide pipe, and a plurality of second guide ribs that protrude from an external surface of the second guide pipe and are slanted in the same direction as the first guide ribs.

The air discharge hole may be formed on the center of a dust separator cover that opens or closes bottom surfaces of the first cyclone unit, the second cyclone unit, and the third cyclone unit.

As can be appreciated from the above description, the second cyclone unit is formed inside the first cyclone unit so that the multi-cyclone dust separator can separate fine dust with greater efficiency without increasing the volume thereof.

BRIEF DESCRIPTION OF THE DRAWINGS

These and/or other aspects and advantages of the invention will become apparent and more readily appreciated from the following description and the accompanying drawings of which.

DETAILED DESCRIPTION OF EXEMPLARY EMBODIMENTS OF THE PRESENT DISCLOSURE

Figure 1:
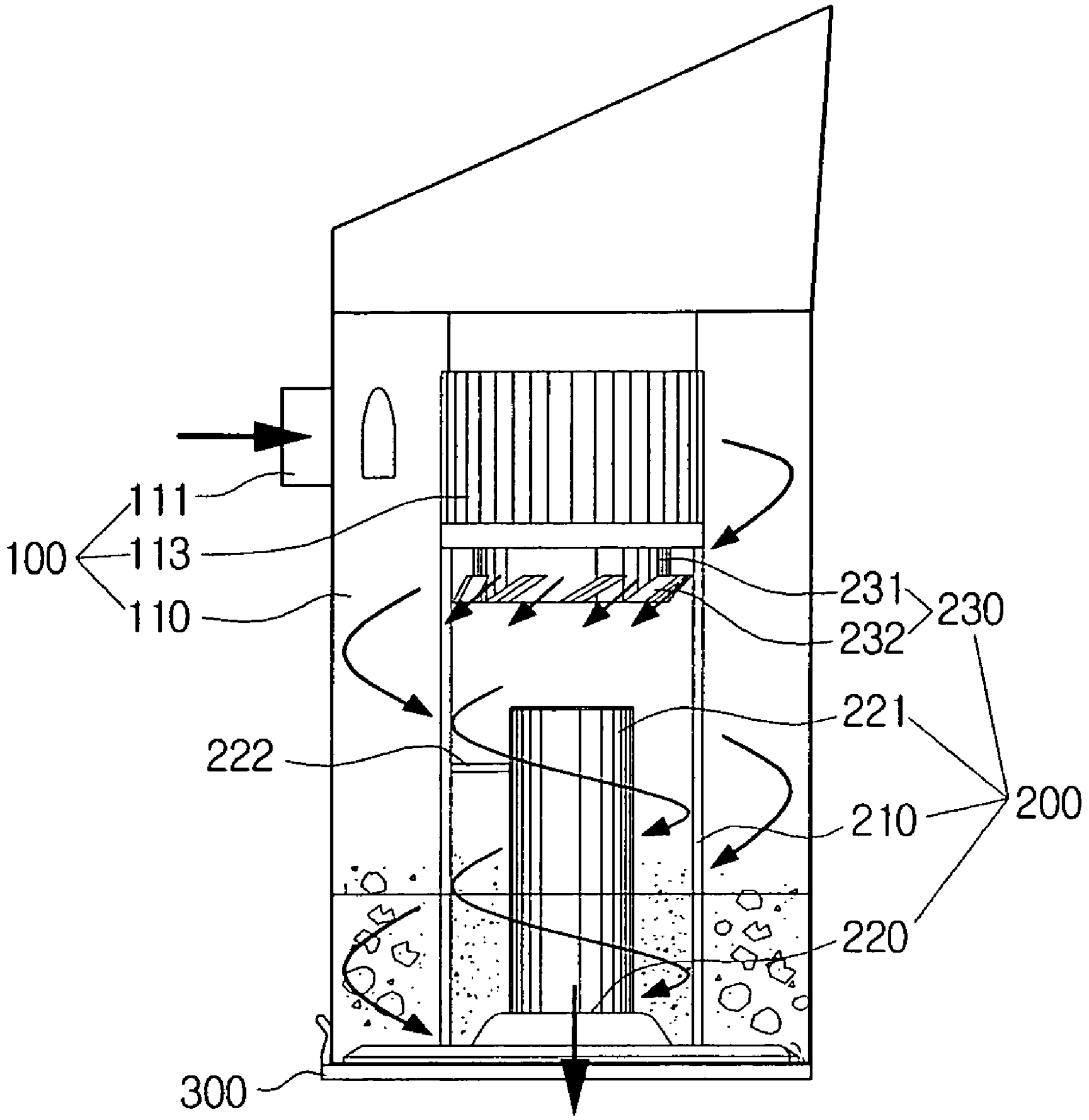
FIGS. 1 to 3 are sectional views illustrating a multi-cyclone dust separator according to an exemplary embodiment of the present disclosure.
Figure 2:
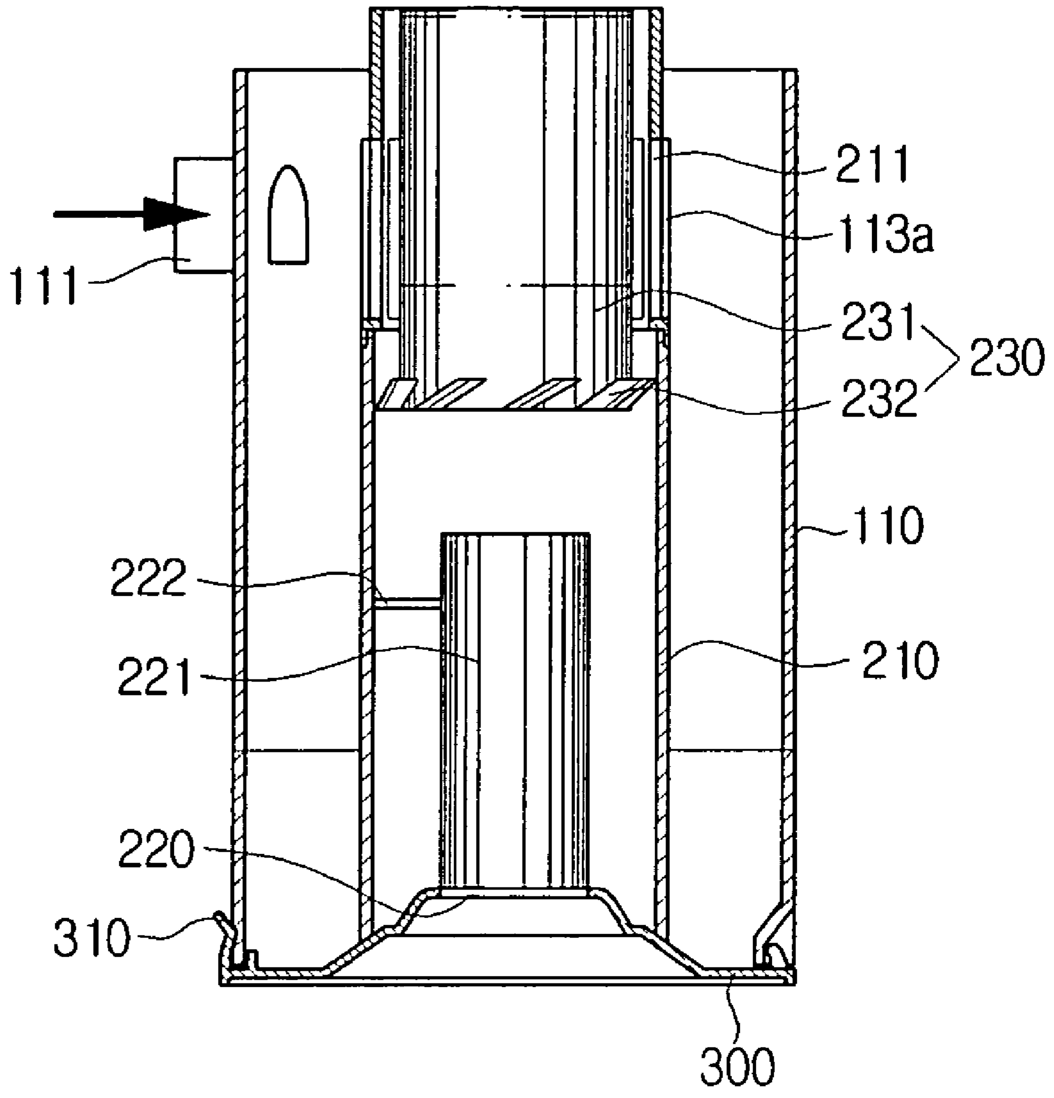

Reference will now be made to the accompanying drawings, throughout which like reference numerals refer to like elements. The embodiments are described below by way of reference to the figures.

FIG. 1 illustrates a multi-cyclone dust separator according to a first exemplary embodiment of the present disclosure.

The multi-cyclone dust separator includes a first cyclone unit 100 and a second cyclone unit 200.

The first cyclone unit 100 includes a first cyclone body 110, on which a first air inlet 111 is formed to draw dust-laden air thereinto so that air drawn through the first air inlet 111 can rotate in the first cyclone body 110, and a dust blocking unit 113 that prevents centrifugally separated dust from entering the second cyclone unit 200. The first cyclone body 110 may be formed in a cylindrical shape.

Figure 10:
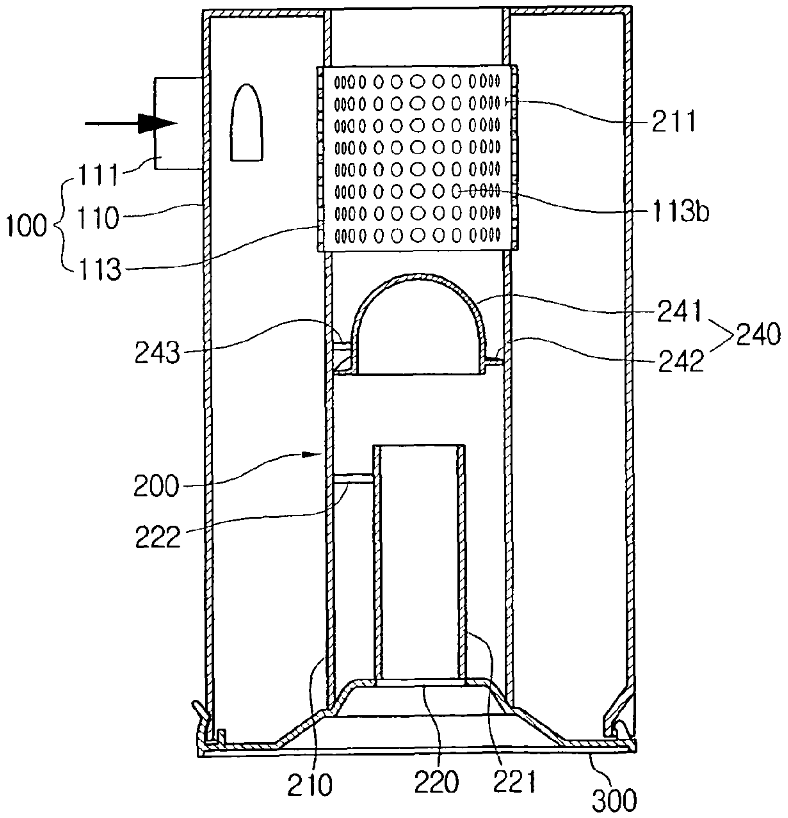
FIG. 10 is a cross-sectional view illustrating dust blocking unit of the multi-cyclone dust separator according to a third exemplary embodiment of the present disclosure.

The dust blocking unit 113 blocks dust centrifugally separated by the first cyclone unit 100 so that large dust is prevented from entering the second cyclone unit 200. The dust blocking unit 113 can be designed in diverse forms. The dust blocking unit 113 may be formed as a plurality of guide vanes 113*a* as illustrated in FIGS. 1 to 4, or as a plurality of holes 113*b* as illustrated in FIG. 10.

The second cyclone unit 200 draws in air from which large dust has been separated by the first cyclone unit 100, and centrifugally separates fine dust from the air. The second cyclone unit 200 includes a second cyclone body 210, an air discharge hole 220, an air discharge pipe 221, and a first guide unit 230.

The second cyclone body 210 is disposed in the core of the first cyclone unit 100. A second air inlet 211 is formed above the second cyclone body 210 to draw in air centrifugally separated by the first cyclone unit 100.

Figure 3:
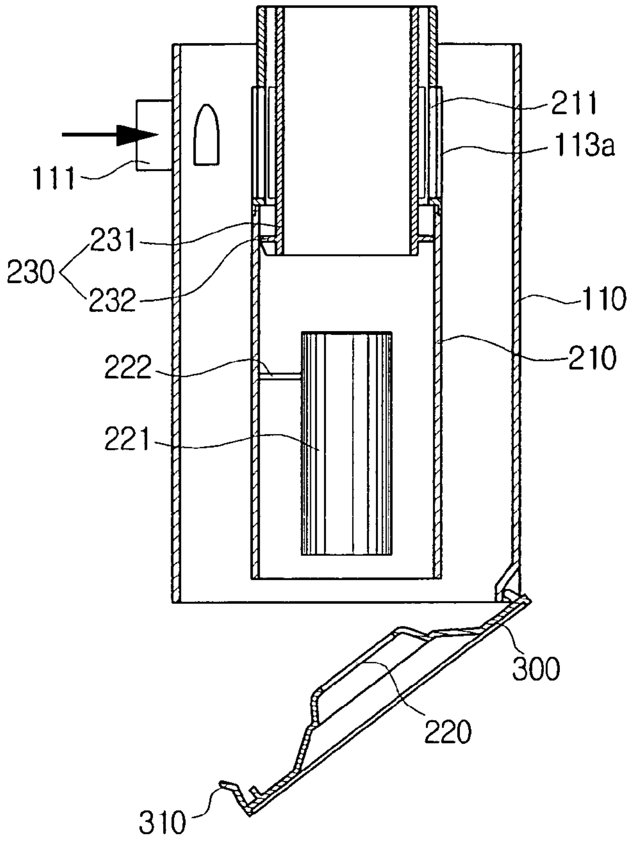

The air discharge hole 220 is formed on the bottom surface of the second cyclone body 210 to discharge air from which fine dust has been separated, to the outside of the vacuum cleaner. The air discharge hole 220 may be formed on the center of a dust separator cover 300 that opens or closes the bottoms of the first and second cyclone units 100 and 200 as illustrated in FIG. 3.

The air discharge pipe 221 prevents dust separated by the second cyclone body 210 from flowing back into the air discharge hole 220. A first end of the air discharge pipe 221 is coupled to the air discharge hole 220, and a second end is formed towards and is spaced apart from the first guide unit 230 at a certain distance. In a preferred embodiment, the air discharge pipe 221 may be formed lower than the dust blocking unit 113. The air discharge pipe 221 is formed in the core of the second cyclone body 210 at a certain height and is fixed to the second cyclone body 210 using at least one fixing rib 222. Accordingly, the air discharge pipe 221 can be fixed at the core of the second cyclone body 210 as illustrated in FIG. 3 even when the dust separator cover 300 gets opened.

The first guide unit 230 is made to rotate air entering the second cyclone body 210 through the second air inlet 211. In the first and second embodiments, the first guide unit 230 includes a first guide pipe 231 and a plurality of first guide ribs 232.

Figure 4:
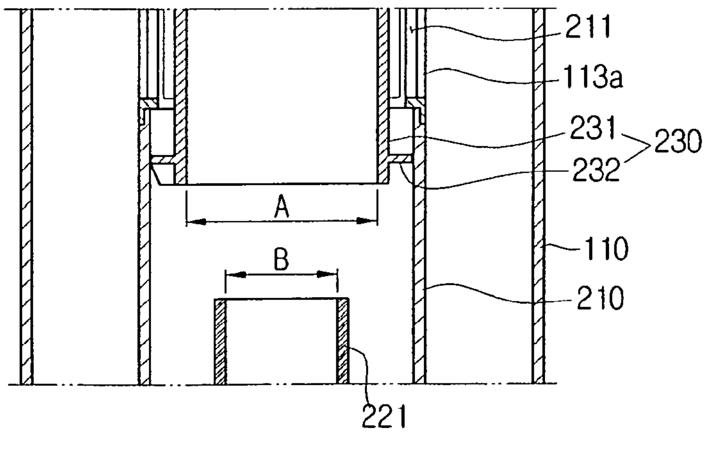
FIG. 4 is a sectional view illustrating the enlarged main part of FIG. 1.

The first guide pipe 231 is disposed in the upper core of the second cyclone body 210. A lower end of the first guide pipe 231 is formed lower than the dust blocking unit 113. As illustrated in FIG. 4, the diameter A of the first guide pipe 231 may be greater than the diameter B of the air discharge pipe 221.

Figure 5A:
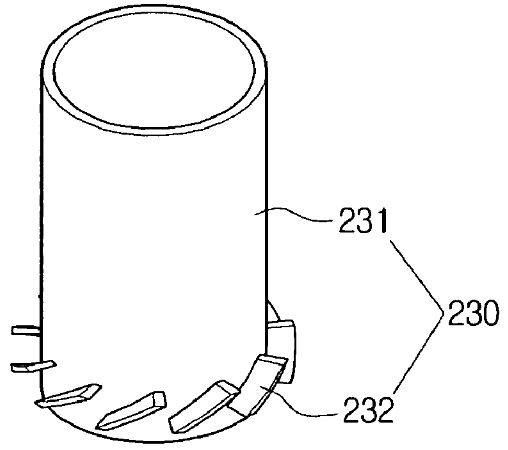
FIGS. 5A and 5B are perspective views illustrating guide units of multi-cyclone dust separators according to first and second exemplary embodiments of the present disclosure.
Figure 5B:
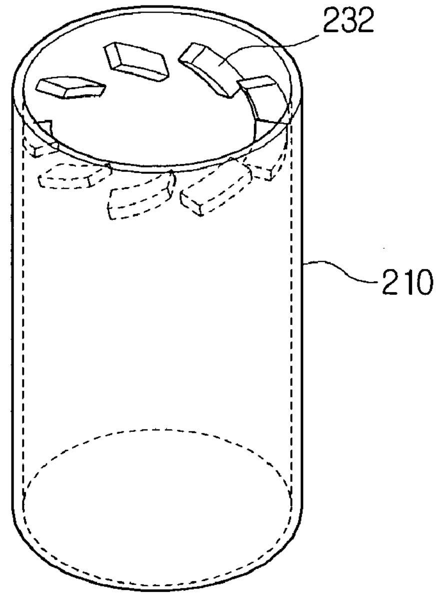
Figure 6:
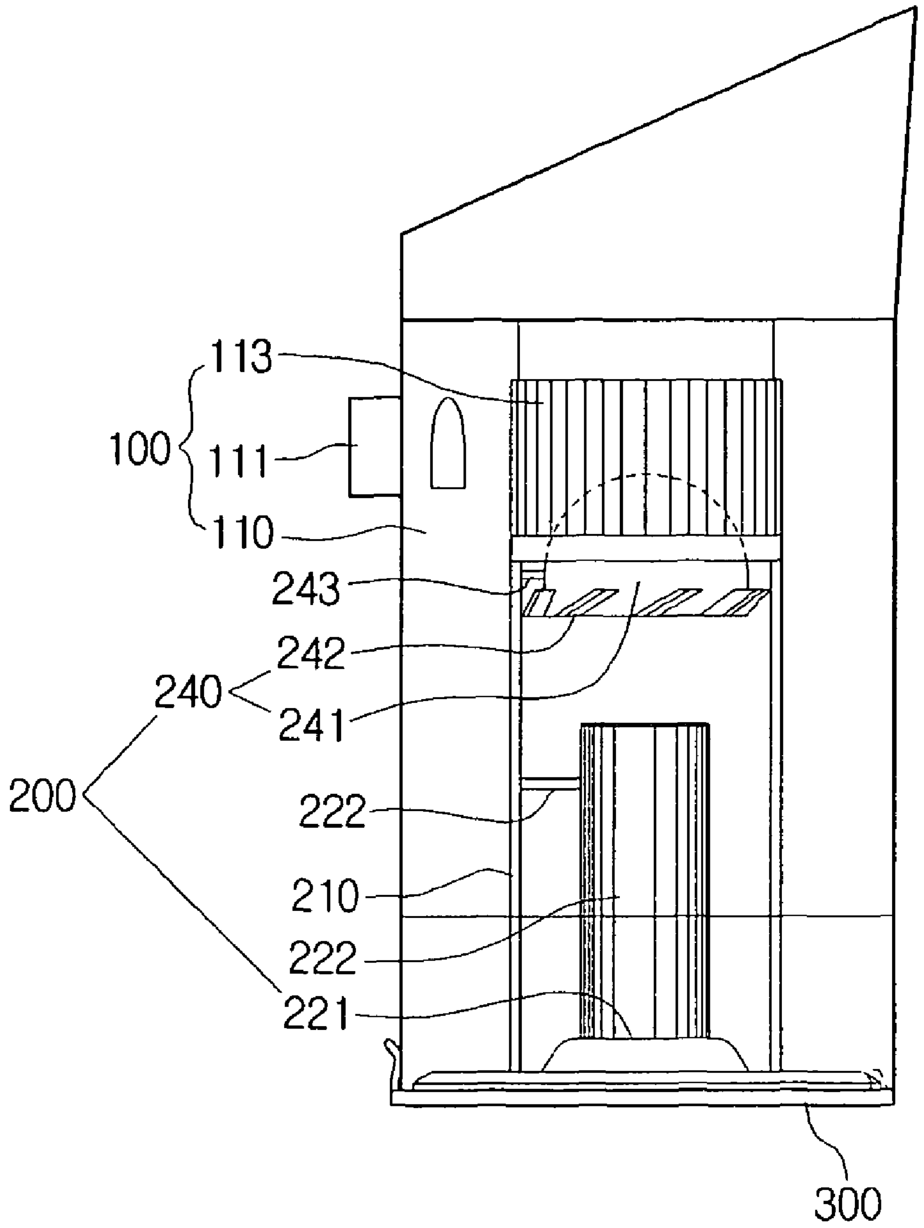
FIGS. 6 to 9 are sectional views illustrating a multi-cyclone dust separator according to a third exemplary embodiment of the present disclosure.

As illustrated in FIGS. 1 to 4 and FIG. 5A, the first guide ribs 232 according to the first exemplary embodiment of the present disclosure protrude from positions located around the external circumference of a first end of the first guide pipe 231 towards the second cyclone body 210. Alternatively, as illustrated in FIG. 5B, the first guide ribs 232 according to the second exemplary embodiment of the present disclosure may protrude from positions disposed around the internal circumference of the second cyclone body 210. In the first and second exemplary embodiments, the first guide ribs 232 have the same shape, arrangement, and height. The difference is that the first guide ribs 232 in the first exemplary embodiment are located on the first guide pipe 231 and the first guide ribs in the second exemplary embodiment are located on the internal surface of the second cyclone body 210. The plurality of first guide ribs 232 may be slanted in the same direction, and, additionally, may be slanted in order to generate a rotation air current of the second cyclone unit 200 in the same direction as a rotating air current of the first cyclone unit 100. The first guide ribs 232 may be formed in a straight line shape or a curved shape having the same slant.

A first guide unit 240 according to the third exemplary embodiment of the present disclosure includes a guide dome 241 having a hemispherical shape and guide dome ribs 242 as illustrated in FIGS. 6 to 9.

The guide dome 241 may be formed lower than the dust blocking unit 113, and may be fixed to the second cyclone body 210 using a dome fixing rib 243.

Figure 7:
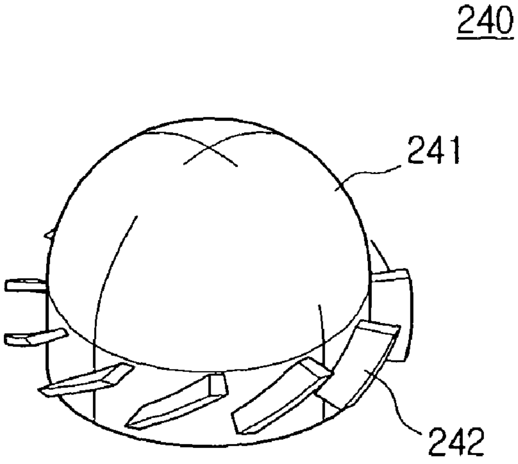
Figure 8:
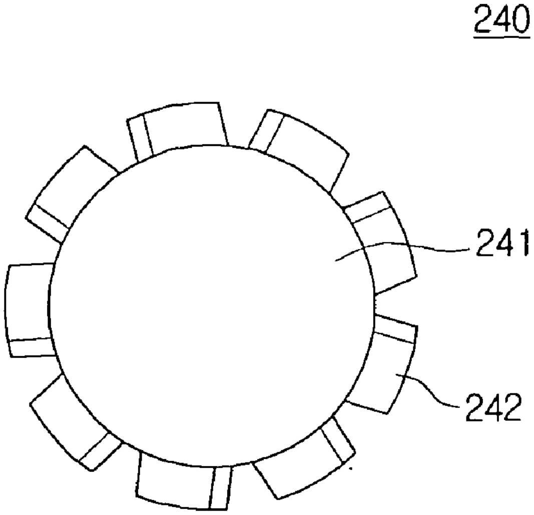

As illustrated in FIGS. 7 and 8, the guide dome ribs 242 protrude from positions around the external circumference of the guide dome 241, and are slanted in the same direction. The guide dome ribs 242 may be formed in the same structure as the first guide ribs 232 according to the first to third exemplary embodiments.

Figure 9:
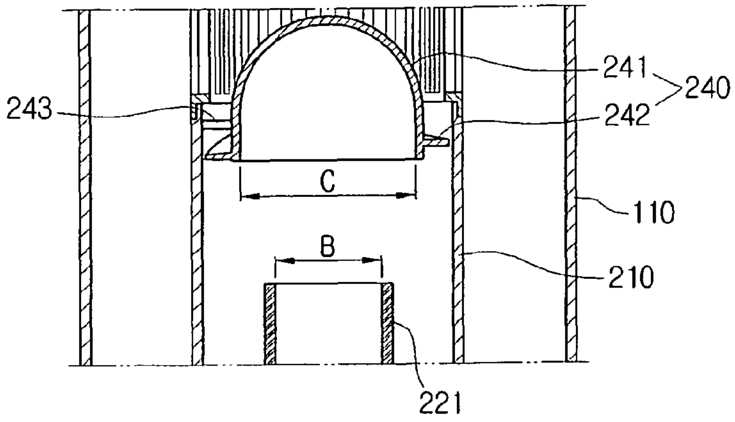

As illustrated in FIG. 9, the diameter C of the guide dome 241 may be greater than the diameter B of the air discharge pipe 221, so that fine dust in air can be centrifugally separated from air using a rotating air current and may be discharged through the air discharge pipe 221.

Figure 11:
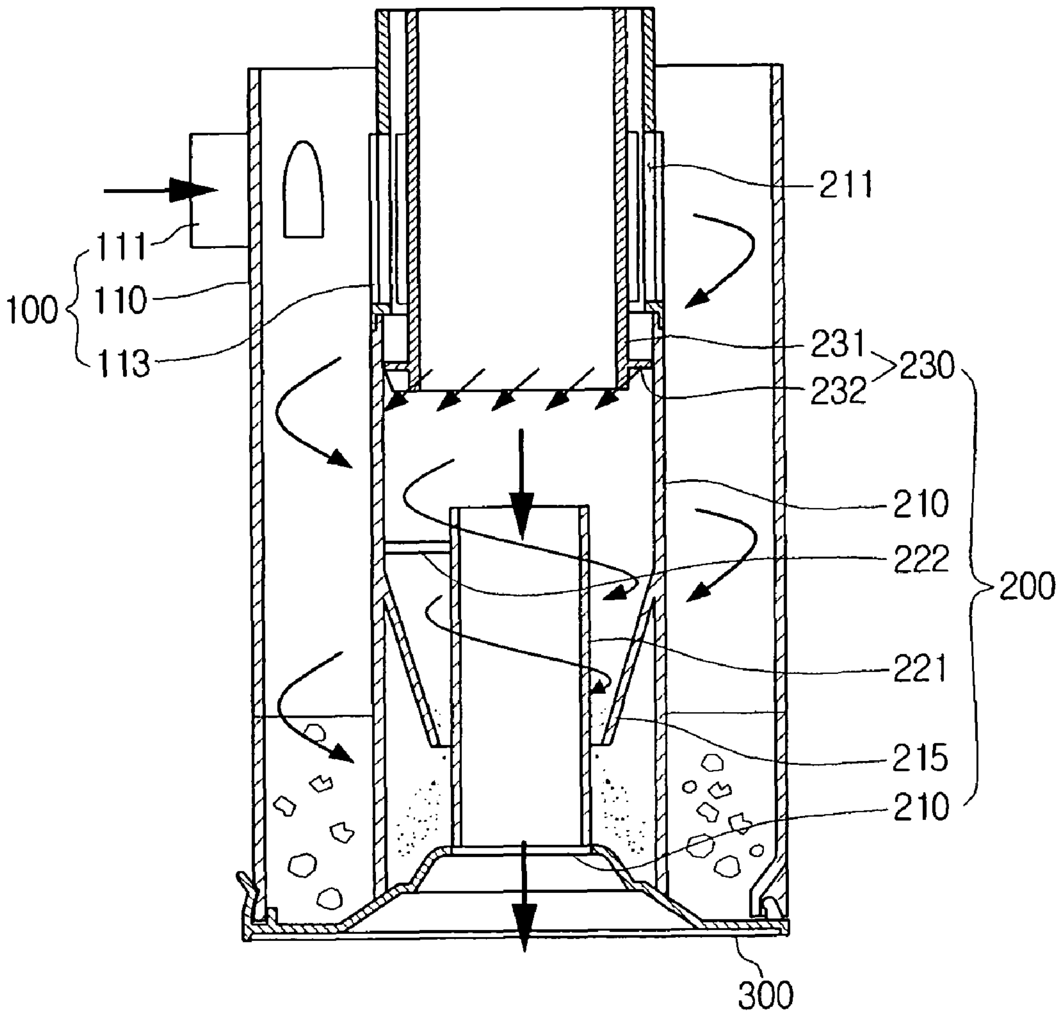
FIG. 11 is a sectional view illustrating a multi-cyclone dust separator according to a fourth exemplary embodiment of the present disclosure.

As illustrated in FIG. 11, a second cyclone unit 200 of a multi-cyclone dust separator according to the fourth exemplary embodiment of the present disclosure further includes a conical guide 215.

A first end of the conical guide 215 is connected to the internal surface of the second cyclone body 210. The diameter of the conical guide 215 may gradually decrease in a downward direction. That is, the diameter at the top of the conical guide 215 is the same as the diameter D of the second cyclone body 210, and the diameter d at the bottom of the conical guide 215 is less than the diameter D at the top of the conical guide 215 and greater than the diameter B of the air discharge pipe 221. The conical guide 215 effectively prevents dust centrifugally separated by the second cyclone body 210 from flowing back and leaking through the air discharge hole 220.

Figure 12:
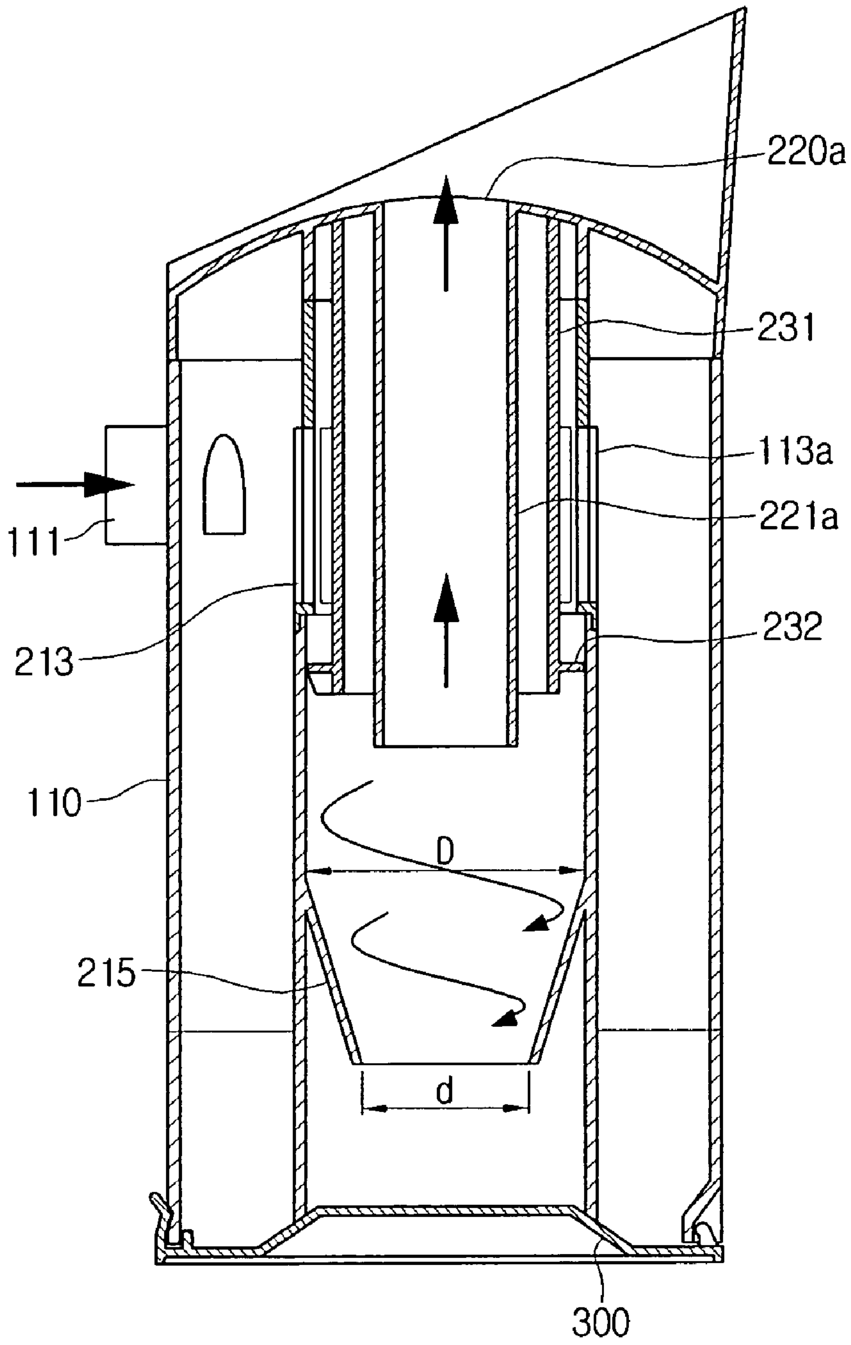
FIG. 12 is a sectional view illustrating a multi-cyclone dust separator according to a fifth exemplary embodiment of the present disclosure.

As illustrated in FIG. 12, a multi-cyclone dust separator according to the fifth exemplary embodiment of the present disclosure includes an air discharge hole 220*a* at the upper part of the second cyclone dust separator 200. In this case, the air discharge hole 220*a* may be formed in the center of the upper part of the multi-cyclone dust separator, and be connected to an air discharge pipe 221*a* formed in the core of the second cyclone body 210. The lower end of the air discharge pipe 221*a* is formed lower than the first guide unit 230. Otherwise, if the air discharge pipe 221*a* is formed higher than the first guide unit 230 and thus formed inside the first guide pipe 231 of the first guide unit 230, air and fine dust that are centrifugally separated by a rotating air current formed by the first guide unit 230 are mixed again and discharged through the air discharge pipe 221*a*.

Figure 13:
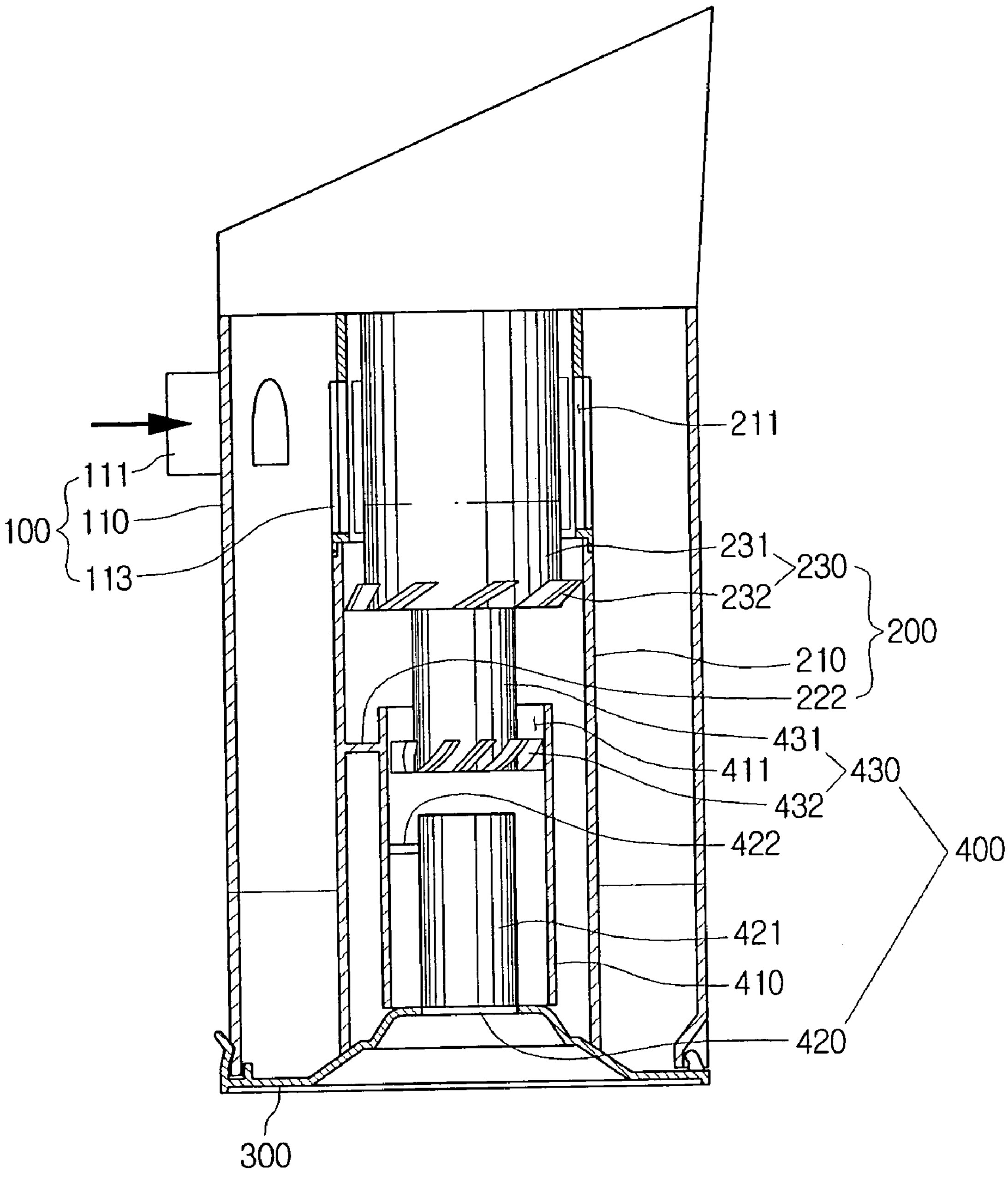
FIG. 13 is a sectional view illustrating a multi-cyclone dust separator according to a sixth exemplary embodiment of the present disclosure.

As illustrated in FIG. 13, a plurality of cyclone units may be arranged in the core of a first cyclone unit 100. A multi-cyclone dust separator according to the sixth exemplary embodiment of the present disclosure includes a first cyclone unit 100, a second cyclone unit 200, a first guide unit 230, a third cyclone unit 400, and a second guide unit 430.

The second cyclone unit 200 is formed in the core of the first cyclone unit 100, and the third cyclone unit 400 is formed in the core of the second cyclone unit 200.

Since the structure of the first cyclone unit 100 and the second cyclone unit 200 is similar to that of the first cyclone unit 100 and the second cyclone unit 200 in the preceding exemplary embodiments, detailed description thereof is not repeated, and only distinctive parts are described here.

The third cyclone unit 400 formed in the core of the second cyclone unit 200 includes a third cyclone body 410, an air discharge hole 420, an air discharge pipe 421, and a second guide unit 430.

The third cyclone body 410 is fixed in the core of the second cyclone body 210 using a first fixing rib 222. A third air inlet 411 is formed in the upper part of the third cyclone body 410.

The air discharge hole 420 is formed on the bottom surface the third cyclone body 410, and may be formed on an air-tight dust separator cover 300 that opens or closes the first to third cyclone units 100, 200 and 400 concurrently. The air discharge hole 420 is connected to the air discharge pipe 421 of a certain height. The air discharge pipe 421 is fixed in the core of the third cyclone body 410 using a second fixing rib 422, and is formed lower than the second guide unit 430.

The second guide unit 430 includes a second guide pipe 431 and second guide ribs 432.

A first end of the second guide pipe 431 is connected to the first guide pipe 231, and a second end of the second guide pipe 431 is towards the air discharge pipe 422, and may be inserted into the third air inlet 411 of the third cyclone body 410, and be formed in the core of the third cyclone body 410. In addition, the diameter of the second guide pipe 431 may be the same as the diameter of the air discharge pipe 421.

As illustrated in FIG. 13, the second guide ribs 432 protrude around the external circumference of the second guide pipe 431, and may be slanted in the same direction as the first guide ribs 232 are slanted. The first guide ribs 232 and the second guide ribs 432 may be formed in a straight line shape or a curved shape.

The operation of the exemplary embodiments of the present disclosure is described with reference to the accompanied drawings.

In the first to fifth exemplary embodiments, since the second cyclone unit 200 is located in the core of the first cyclone unit 100 and basic operation is the same, the operation of the first exemplary embodiment illustrated in FIGS. 1 to 4 is described here.

If cleaning is started, dust-laden air is drawn into the first cyclone body 110 through the first air inlet 111, as illustrated in FIG. 1. Since the first air inlet 111 is formed on a side of the first cyclone body 110, air drawn into the first cyclone body 110 moves along the internal surface of the first cyclone body 110 so that a rotating air current is generated.

Dust is centrifugally separated from air by the rotating air current and collected at the bottom of the first cyclone body

110. Air passing through the first cyclone body 110 enters the second cyclone unit 200 through the second air inlet 211. The second air inlet 211 is protected by the dust blocking unit 113 that has a plurality of guide vanes 113*a* or a plurality of holes 113*b*, so centrifugally separated large dust cannot flow back into the second cyclone unit 200.

The primarily filtered air entering the second air inlet 211 is rotated inside the second cyclone body 210 by the first guide unit 230. That is, air entering the second cyclone unit 200 through the second air inlet 211 is rotated in the same direction as the rotating air current generated in the first cyclone unit 100. However, since the rotation force of air entering the second cyclone unit 200 is not very strong, the air rotates around and falls along the first guide pipe 231 that faces the second air inlet 211. The falling air receives a rotation force again from the first guide ribs 232 protruding around the lower end of the first guide pipe 231, so the air rotates around the internal surface of the second cyclone body 210. Thus, fine dust that has not been separated by the first cyclone unit 200 can be centrifugally separated.

The first guide ribs 232 enable air entering the second cyclone body 210 to rotate in the same direction as air rotates in the first cyclone unit 100, so the rotational velocity of the rotating air current can be prevented from being reduced.

After fine dust remaining in the primarily filtered air is centrifugally separated again by the rotating air current generated by the second cyclone body 210, the secondarily filtered air rises along the external surface of the air discharge pipe 221 and is discharged outside the multi-cyclone separator through the air discharge hole 220.

The first guide unit 230 may consist of the first guide pipe 231 and the first guide ribs 232 as illustrated in FIGS. 1 to 5B, or may consist of the guide dome 241 and the guide dome ribs as illustrated in FIGS. 6 to 10, but the principle of operation is the same.

If the multi-cyclone dust separator is full of dust, the user can dump the dust by simply opening up the dust separator cover 300 that opens or closes the first and second cyclone units 100 and 200 concurrently, as illustrated in FIG. 3. The dust separator cover 300 may be locked or released by a locking hook 310 that can be elastically transformed, but such a locking unit may be implemented in diverse structures other than that described here.

In FIG. 13, the three cyclone units are sequentially arranged in the core of the multi-cyclone dust separator. That is, the second cyclone unit 200 is arranged in the core of the first cyclone unit 100, and the third cyclone unit 400 is arranged in the core of the second cyclone unit 200. Accordingly, since dust is centrifugally separated three times in the order of the first cyclone unit 100, the second cyclone unit 200, and then the third cyclone unit 400, fine dust can be filtered more efficiently.

As can be appreciated from the above description, two or more cyclone units are formed in the core of the first cyclone unit 100 so that the multi-cyclone dust separator can be miniaturized more than a conventional multi-cyclone dust separator in which a plurality of second cyclone units are arranged around a first cyclone unit in parallel.

Furthermore, the air paths of the two or more cyclone units can be ensured to be a certain size so that blocking of the air paths can be prevented.

While the invention has been shown and described with reference to certain embodiments thereof, it will be understood by those skilled in the art that various changes in form and details may be made thereto without departing from the spirit and scope of the invention as defined by the appended claims.

What is claimed is:

1. A multi-cyclone dust separator, comprising:

a first cyclone unit that centrifugally separates dust from a dust-laden air stream drawn into the first cyclone unit through a first air inlet;

a second cyclone unit that is formed inside the first cyclone unit, wherein the second cyclone unit comprises:

a second cyclone body that comprises a second air inlet through which the dust-laden air stream enters the second cyclone body, a guide unit that imparts rotation to the dust-laden air stream upon entry of the dust-laden air stream into the second cyclone unit, an air discharge hole that is formed on a bottom surface of the second cyclone body, and an air discharge pipe that is fixed to the second cyclone body and is connected to the air discharge hole; and a dust blocking unit that prevents the dust separated by the first cyclone unit from entering the second cyclone unit through the second air inlet.

2. The multi-cyclone dust separator of claim 1, wherein the dust blocking unit comprises a plurality of guide vanes that are formed on the second air inlet at regular intervals.

3. The multi-cyclone dust separator of claim 1, wherein the dust blocking unit comprises a plurality of holes that are formed on the second air inlet.

4. The multi-cyclone dust separator of claim 1, wherein the air discharge hole is formed on a center of a dust separator cover, the dust separator cover being configured to open or close bottom surfaces of the first cyclone unit and the second cyclone unit.

5. The multi-cyclone dust separator of claim 4, wherein the air discharge pipe is formed lower than the dust blocking unit.

6. The multi-cyclone dust separator of claim 1, wherein the guide unit comprises:

a guide pipe that is formed inside the second air inlet; and a plurality of guide ribs that protrude from an external surface of the guide pipe.

7. The multi-cyclone dust separator of claim 6, wherein the plurality of guide ribs are formed lower than the dust blocking unit and are slanted in a common direction.

8. The multi-cyclone dust separator of claim 1, wherein the guide unit comprises:

a guide pipe that is formed inside the second air inlet; and a plurality of guide ribs that protrude from an internal surface of the second cyclone body and are slanted in a common direction.

9. The multi-cyclone dust separator of claim 7, wherein the guide pipe has a diameter that is greater than a diameter of the air discharge pipe.

10. The multi-cyclone dust separator of claim 8, wherein the guide pipe has a diameter that is greater than a diameter of the air discharge pipe.

11. The multi-cyclone dust separator of claim 1, wherein the guide unit comprises:

a guide dome that is formed inside the second air inlet and has a hemisphere shape; and a plurality of guide dome ribs that protrude from an external surface of the guide dome and are slanted in a common direction.

12. The multi-cyclone dust separator of claim 1, wherein the guide dome has a diameter that is greater than a diameter of the air discharge pipe.

13. The multi-cyclone dust separator of claim 4, wherein the second cyclone unit further comprises a conical guide, an upper part of the conical guide being connected to an internal surface of the second cyclone body and a lower part of the conical guide having a diameter that is less than a diameter of the second cyclone body and greater than a diameter of the air discharge pipe.

14. The multi-cyclone dust separator of claim 1, wherein the second cyclone unit comprises:

an air discharge hole that is formed on an upper part of the second cyclone body; and an air discharge pipe that is fixed to the second cyclone body and is connected to the air discharge hole.

15. The multi-cyclone dust separator of claim 14, wherein the second cyclone unit further comprises a conical guide, an upper part of the conical guide being connected to an internal surface of the second cyclone body and a lower part of the conical guide having a diameter that is less than a diameter of the second cyclone body and greater than a diameter of the air discharge pipe.

16. A multi-cyclone dust separator, comprising:

a first cyclone unit that centrifugally separates dust from a dust-laden air stream drawn into the first cyclone unit through a first air inlet;

a second cyclone unit that is formed inside the first cyclone unit; and a third cyclone unit that is formed inside the second cyclone unit, wherein the second cyclone unit comprises:

a second cyclone body that comprises a second air inlet through which the dust-laden air stream enters the second cyclone body; and a first guide unit that imparts rotation to the dust-laden air stream upon entry of the dust-laden air stream into the second cyclone unit, and wherein the third cyclone unit comprises:

a third cyclone body that comprises a third air inlet through which the dust-laden air stream, from which the dust has been separated by the second cyclone unit, enters the third cyclone body; and a second guide unit that imparts rotation to the dust-laden air stream upon entry of the dust-laden air stream into the third cyclone unit, wherein the second cyclone unit is fixed to a core of the first cyclone unit, and the third cyclone unit is fixed to a core of the second cyclone unit, and wherein the third cyclone unit comprises:

a third cyclone body that is fixed to an internal surface of the second cyclone unit using at least one first fixing rib;

an air discharge hole that is formed on a bottom surface of the third cyclone body; and an air discharge pipe that is fixed to an internal surface of the third cyclone body using at least one second fixing rib and is connected to the air discharge hole.

17. The multi-cyclone dust separator of claim 16, further comprising:

a dust blocking unit that prevents the dust separated by the first cyclone unit from entering the second cyclone unit through the second air inlet.

18. The multi-cyclone dust separator of claim 16, wherein the first guide unit comprises:

a first guide pipe that is formed inside the second air inlet and has a diameter that is greater than the second cyclone unit; and a plurality of first guide ribs that protrude from an external surface of the first guide pipe and are slanted in a common direction.

19. The multi-cyclone dust separator of claim 18, wherein the second guide unit comprises:

a second guide pipe that is formed inside the third air inlet and is connected at one end to the first guide pipe; and a plurality of second guide ribs that protrude from an external surface of the second guide pipe and that are slanted in a direction that is the same common direction as the first guide ribs.

20. The multi-cyclone dust separator of claim 19, wherein the air discharge hole is formed centrally on a dust separator cover that opens or closes bottom surfaces of the first cyclone unit, the second cyclone unit, and the third cyclone unit.

* * * * *